US011259538B2

(12) United States Patent
Van Der Velde et al.

(10) Patent No.: US 11,259,538 B2
(45) Date of Patent: *Mar. 1, 2022

(54) PROCESS FOR THE PRODUCTION OF PASTA FILATA CHEESE PRODUCTS

(71) Applicant: DMK Deutsches Milchkontor GmbH, Zeven (DE)

(72) Inventors: Henk Van Der Velde, Haskerhorne (NL); Ralf Mankiewitz, Holtsee (DE); Deyk Tiedemann, Nieder Ochtenhausen (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 185 days.

This patent is subject to a terminal disclaimer.

(21) Appl. No.: 16/296,957

(22) Filed: Mar. 8, 2019

(65) Prior Publication Data

US 2019/0274325 A1 Sep. 12, 2019

(30) Foreign Application Priority Data

Mar. 12, 2018 (EP) .................................. 18161179

(51) Int. Cl.
| | |
|---|---|
| *A23C 19/068* | (2006.01) |
| *A23C 9/14* | (2006.01) |
| *A23C 19/05* | (2006.01) |
| *A23C 7/04* | (2006.01) |
| *A23C 19/09* | (2006.01) |
| *A01J 25/00* | (2006.01) |

(52) U.S. Cl.
CPC ......... *A23C 19/0684* (2013.01); *A01J 25/008* (2013.01); *A23C 7/046* (2013.01); *A23C 9/14* (2013.01); *A23C 19/05* (2013.01); *A23C 19/0917* (2013.01)

(58) Field of Classification Search
CPC ....... A23C 19/0684; A23C 7/046; A23C 9/14; A23C 19/05; A23C 19/0917; A01J 25/008
USPC ..... 426/580, 582, 34, 36, 38, 40, 41, 42, 43
See application file for complete search history.

(56) References Cited

U.S. PATENT DOCUMENTS

2003/0152686 A1 8/2003 Bradley

FOREIGN PATENT DOCUMENTS

DE 3217310 A1 11/1983

OTHER PUBLICATIONS

Van Abeelen et al., DE 10348733B4, 2008, google translation.*
"Tetra Tebel Pasta Filata Efficiency line solutions," Jan. 1, 2010, pp. 1-4.
Tamine et al., "Yoghurt, Science and Technology. 2nd ed.," Woodhead Publishing, Jan. 1, 1999, pp. 11-35.
Rosenberg, "Current and future applications for membrane processes in the dairy industry," Trends in Food Science & Technology, 6(1), Jan. 1, 1995, pp. 12-19.
Faccia et al., "Influence of the Milk Bactofugation and Natural Whey Culture on the Microbiological and Physico-Chemical Characteristics of Mozzarella Cheese," J. Food Process Technol, (2013), 4(4) pp. 1-7.

* cited by examiner

*Primary Examiner* — Leslie A Wong
(74) *Attorney, Agent, or Firm* — Dilworth & Barrese, LLP

(57) ABSTRACT

Pasta filata cheese products of the Mozzarella type are suggested, obtainable or obtained by:
(a) subjecting milk to bactofugation or filtration, obtaining a bactofugate or a bacterial concentrate and a treated milk;
(b) sterilising and, optionally, standardising the bactofugate or the bacterial concentrate obtained in step (b);
(c) blending the treated milk of step (a) with the sterilised bactofugate or the bacterial concentrate of step (b);
(d) coagulating the blended product of step (c) while adding starter cultures and/or rennet;
(e) separating the coagulated milk of step (d) into whey and curd;
(f) processing the whey with fine curd particles contained therein obtained in step (e) into a stable suspension;
(g) subjecting the curd obtained in step (e) to heat treatment, and
(h) shaping the heat-treated product of step (g),
wherein the suspension produced in step (f) is either added to the bactofugate or the bacterial concentrate obtained in step (a), or to the sterilised bactofugate or the bacterial concentrate obtained in step (b).

9 Claims, 2 Drawing Sheets

PROCESS FOR THE PRODUCTION OF PASTA FILATA CHEESE PRODUCTS

FIELD OF THE INVENTION

The invention is in the field of dairy and cheese products and relates to Mozzarella cheese which is characterised by improved functional characteristics on the one hand, and to a method for the production thereof on the other.

STATE OF THE ART

Mozzarella (Italian: mozzarella diminuitive of mozza=fresh cheese, or mozzare=to separate) is a pasta filata cheese of Italian origin made from the milk of the Italian Mediterranean buffalo, or the common cow, or a mixture of both types of milk. The fat content amounts to 50% by weight (buffalo) or 45% by weight (cow) of fat in dry matter. Nowadays, Mozzarella based on cow's milk is widely distributed and is made in many places in the world, as the place of manufacture has not been regulated. The EU protected genuine buffalo's mozzarella under the "protected designation of origin" (Italian: DOP) scheme. Such Mozzarella may only be produced within a precisely described region.

With a maturing time of just one to three days, Mozzarella is a fresh cheese which, however, is produced in a specific manner. In contrast to the production of semi-hard cheese where shaping is performed by a pressing process, Mozzarella is subjected to temperature treatment that allows it to obtain its typical soft-to-firm form. To do so, the curd is initially allowed to mature for a certain period; subsequently, it is scalded with hot water or steam having about 60 to 90° C., and is then kneaded and stretched until it is soft, malleable and shapeable. Then it is cut into pieces and shaped into balls, blocks, leaves, or strands. The finished product is kept floating in brine or whey and is marketed in this state, which allows it to maintain its savory and salty taste. In contrast to hard cheese, any co-use of calcium chloride to increase product solidity is not permitted.

When fresh and new, the cheese paste is malleable and may be cut easily; later, it becomes softer and mushier and develops a more pronounced flavour and taste. In addition to direct consumption, however, Mozzarella also enjoys a great significance in the Italian cuisine in the production of pizza. No other cheese than Mozzarella is forming such threads and obtains such a crispy brown tint without this affecting the product's taste. However, the products on the market exhibit considerable differences in quality: some varieties are practically taste-free or even have a slightly musty taste, others exhibit a strong tendency to incorporate water, suddenly releasing it at an inappropriate moment ("oiling out"). Still others are so soft that they can neither be cut nor grated, nor do they form any threads. Still others do not obtain a brown tint, but char.

Particularly due to its unique thermo-physical properties and its particular taste, there is a special demand for those Mozzarella grades which, in fact, combine these particular properties.

RELEVANT STATE OF THE ART

Patents EP 0535268 B1 and EP 0809441 B1 (LEPRINO) disclose a Mozzarella product which is obtained in the following way: a) pasteurising cow's or buffalo's milk; b) acidifying milk in order to transfer it into cheese milk; c) coagulating the cheese milk, so that a coagulum of curd and whey is obtained; d) cutting the coagulum and allowing the whey to drain, in the process of which curd remains; e) heating, kneading and stretching the curd until it becomes a homogeneous fibrous mass of heated, unmatured cheese; f) shaping the heated cheese; g) cooling the shaped cheese in cold salt water (brine); and h) removing the cooled cheese from the brine; wherein a small amount of at least one cheese additive is blended into the heated cheese between steps (e) and (f).

The subject matter of EP 1576886 B1 (KRAFT) is a process for the production of pasta filata cheese products of the Mozzarella type, comprising the following steps: a) providing curd, b) heating, kneading and stretching the curd, together with any desired ingredients, c) extruding the cheese products, and d) cooling the cheese product in cold brine.

EP 2168429 B1 (BUHLER) discloses a process for the production of a fermented dairy product, particularly Mozzarella, comprising the following steps: a) charging an extruder with a preliminary product, particularly Cagliata; b) transporting the preliminary product along the transport path extending within the extruder between the charging orifice and the shaping exit orifice of the extruder; c) adding salt, particularly sodium chloride, to the preliminary product during the extrusion process.

In this context, it is also referred to German patent application No. DE 103 48 733 A1 (CAMPINA), disclosing the addition of stable curd suspensions within the context of the production of cheese. The application, however, merely relates to the production of hard cheese and not to Mozzarella. Moreover, the object of the application merely is to recirculate the high-protein curd particles into the process, instead of losing them through the whey.

The object of the present invention was, therefore, to provide a new grade of Mozzarella that fully complies with its complex physical and sensory profile on the one hand, and to develop a corresponding process that provides such grade without any additional technical effort on the other.

DESCRIPTION OF THE INVENTION

A first subject matter of the invention relates to pasta filata cheese products of the Mozzarella type, obtainable or obtained by:
(a) subjecting milk to bactofugation or filtration, obtaining a bactofugate or a bacterial concentrate and a treated milk;
(b) sterilising and, optionally, standardising the bactofugate or the bacterial concentrate obtained in step (b);
(c) blending the treated milk of step (a) with the sterilised bactofugate or the bacterial concentrate of step (b);
(d) coagulating the blended product of step (c) while adding starter cultures and/or rennet material;
(e) separating the coagulated milk of step (d) into whey and curd;
(f) processing the whey obtained in step (e) with the fine curd particles contained therein into a stable suspension;
(g) subjecting the curd obtained in step (e) to heat treatment, and
(h) shaping the heat-treated product of step (g),
wherein the suspension produced in step (f) is either added to the bactofugate or the bacterial concentrate obtained in step (a), or to the sterilised bactofugate or bacterial concentrate obtained in step (b).

As shown in the following experimental part, the Mozzarella of the invention has other thermo-physical properties, so that not only a new process is provided herein, but, in fact, a new product is obtained.

Another subject matter of the invention relates to a process for the production of pasta filata cheese products of the Mozzarella type, comprising or consisting of the following steps:
(i) providing milk;
(ii) coagulation of the milk while adding starter cultures and/or rennet material;
(iii) separation of the coagulated milk of step (ii) into whey and curd;
(iv) processing the whey with fine curd particles ("cheese fines") contained therein obtained in step (iii) into a stable suspension;
(v) heat treatment of the curd obtained in step (iii); and
(vi) shaping and cooling of the heat-treated product obtained in step (v);
which is characterised in that
(vii) before the separation of milk and curd, the process contains a further step, wherein the milk is subjected to bactofugation, obtaining a bactofugate and a treated milk;
(viii) the bactofugate obtained in step (vii) is sterilised, and the sterilised bactofugate is added to the treated milk; and
(ix) the suspension produced in step (iv) is either added to the bactofugate obtained in step (vi), or to the sterilised bactofugate obtained in step (vii).

Surprisingly, it was found that adding the curd particles that are stably suspended in the whey or in a suitable liquid to the cheese milk before coagulation had a lasting positive influence on product properties. Particularly, the stretching and grating behaviour as well as the solidity of the mass improved, its tendency to oil out is reduced, its development of a brown tint is enhanced and its taste is intensified. Applicant's observations indicate that particularly curd particles subjected to homogenisation may exhibit a distribution of particle sizes which may be incorporated particularly advantageously into the cheese milk, causing the improvement of the thermo-physical properties found. Adding mechanically comminuted curd, in any case, proved to be useless.

BRIEF DESCRIPTION OF THE DRAWINGS

The present invention will be described in greater detail with reference to the accompanying drawings in which.

INGREDIENTS AND STANDARDISATION

Figure 1:
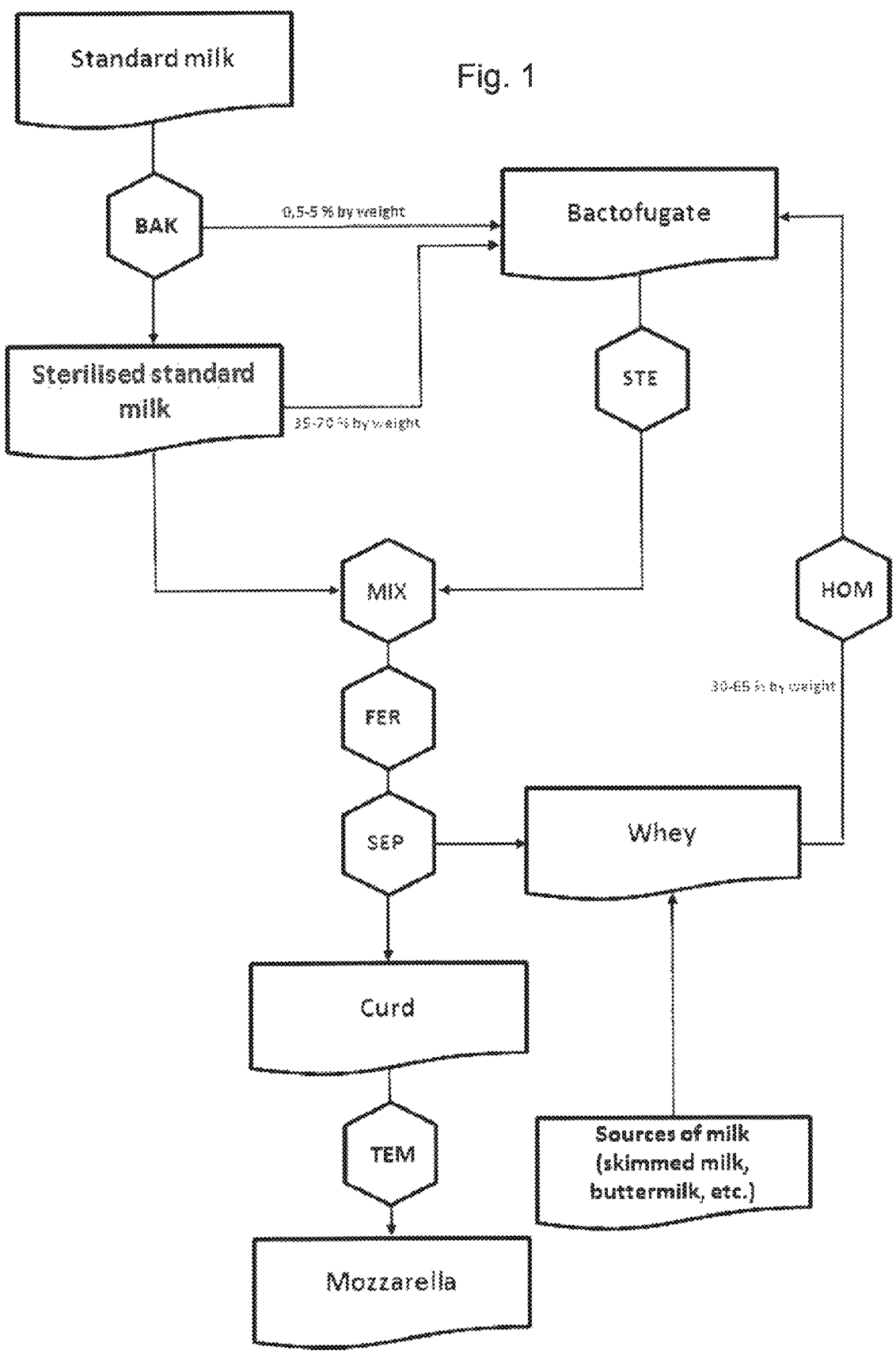
FIG. 1 illustrates a flow chart of the process according to the present invention.

Suitable ingredients for the production of pasta filata cheese products, particularly for Mozzarella, comprise raw milk, partially skimmed milk and particularly skimmed milk, wherein the fat content is preferably within the range of about 1 to about 5% by weight.

A particularly preferred ingredient is the so-called standard milk (also referred to as standardised milk). It is one of the above ingredients which is adjusted to a defined fat content or protein content by adding, for example, cream ("standardisation"). To this end, a fat-to-protein ratio of about 0.2 to about 1.2 is usually employed.

Sterilisation

Both non-standardised and standardised milk contain germs, particularly thermophilic spores which are, among other things, detrimental to the human health and have to be removed by suitable measures according to the relevant statutory regulations, but also in order to improve the quality. This is typically performed by filtration or bactofugation.

In the process of bactofugation, milk is separated into a low-germ fraction and a bacterial concentrate ("bactofugate") in a centrifuge ("bactofuge"). The bactofugate (or, more generally, bacterial concentrate), however, does not constitute a waste product, but is merely a highly contaminated milk. Therefore, the concentrate is subjected to a sterilisation step at more than 100° C., typically at 120 to 140° C., in the process of which all thermophilic germs are killed. Subsequently, the sterilised phase may be added to the low-germ phase, so that, in practice, no amount of milk is lost. In short, a type of milk is produced in this manner, which has such a low germ load that it is does not pose any health risks and complies both with the legal requirements and the quality standards. The blended product of low-germ milk and sterilised bacterial concentrate obtained in this manner is referred to as milk in the vat or cheese milk within the meaning of the present invention.

Coagulation and Separation

Coagulation of (standardised) milk is performed by adding starter cultures and/or rennet material. Particularly suitable for the purpose of pasta filata cheese products in general and for Mozzarella in particular are *Streptococcus thermophilus* and/or *Lactobacillus thermobacterium*, as described, for example, in DE 2632832 A1 (LEPRINO). In addition, rennet is added to the milk, which is a natural mixture of the enzymes chymosin and pepsin. The respective amounts are within the range of about 0.5 to about 5% by weight, and preferably at about 1 to about 2% by weight—based on the milk in the vat or cheese milk. The starter cultures and the enzymes cause the pH value to decrease, and the milk protein is precipitated. Separation may also be performed in a conventional manner, in the process of which the pressing out of whey, which is typical for the production of semi-hard cheese, is not very suitable. Instead, simple sieves or, preferably, drainage belts are suitable for this purpose.

Homogenisation and Suspension Additive

Usually, the whey formed during coagulation is initially conditioned by skimming separators and/or clarifying separators. Depending on the separation conditions, it may still contain various amounts of fine curd particles. It is, in principle, a valuable product which is typically lost together with the low-value whey, or is separated in the separators and is used as a good of lower value, for example, for the production of processed cheese.

However, an essential finding of the present invention was that just this material which is rather considered a kind of waste material has the property of significantly improving the thermo-physical properties of pasta filata cheese products. To this end, it is, however, particularly advantageous to homogenise the particles, as a homogeneous distribution of particles has a particularly beneficial effect on product properties. Herein, the term homogenisation has the same meaning as the comminution of differently sized particles to a uniform size.

In the simplest case, homogenisation may be performed directly within the whey.

In a first alternative embodiment, the whey with fine curd particles contained therein may also be subjected to conditioning, in which the whey is wholly or partly removed and/or exchanged for water, another dairy product, or a dairy-based product. Subsequently, the intermediate product such obtained is homogenised. This means, in particular, that the whey is skimmed in a separator, the curd particles are separated ("removal of cheese fines") and collected by decanting.

In a further embodiment, it is possible to subject the whey with fine curd particles contained therein to conditioning, in which whey is wholly or is substantially separated (to at least 90% by weight);

the resulting dry or substantially dry (with a residual moisture content of 5% by weight) curd particles are re-suspended in water or in another dairy product, and the suspension such obtained is subjected to homogenisation.

Homogenisation or comminution of the fine curd particles may be performed in various manners, i.e., mechanically, thermally, or (bio)chemically, or by a combination of two processes. As the curd particles have a particle size distribution with the largest particles having a diameter of about 1 to 2 mm, homogenisation is, obviously, also possible by sorting or straining.

Mechanical comminution may be performed using means such as a homogeniser, a colloid mill, a ball mill, a high shear mixer and a disc mill, but it is also possible to employ ultrasound techniques. Among these mechanical means, the disc mill provided good results. A disc mill is a device in which two aluminium oxide discs are set up in parallel within a short distance from one another, rotating in opposite directions. A suspension with fine curd particles contained therein is continuously supplied between the discs under pressure and the fine curd particles are comminuted by the discs rotating in opposite directions. The distance of the discs has an impact on the maximum size of the comminuted fine curd particles eventually obtained.

Thermal comminution is particularly preferred in this context, i.e., through the formation of cavitation where the particles are caused to implode.

In principle, also chemical or biochemical processes may be considered where the particles are initially dissolved and then re-crystallised. This requires, however, a considerable effort and is, therefore, less preferred.

For the purpose of the invention it is useful to add the homogenised curd particles to the bactofugate or the sterilisation product thereof in the form of a stable suspension. This is understood as meaning that the particles are present in the liquid phase in a stable suspension, and that they do not form sediments containing particles having a diameter of less than 250 μm, preferably less than 150 μm. Consequently, the particles had been ground or homogenised to this size before.

It also proved to be advantageous to add suspensions having a portion of solid curd particles within the range of about 1 to about 10% by weight. In suspensions of higher concentrations there is a higher risk of a deposition of sediments.

According to the invention, the suspensions are not added to the milk in the vat or cheese milk, but to the bactofugate or the sterilised bactofugate. The first alternative is preferred herein, because this manner ensures that no germs are introduced. In doing so, amounts of about 1 to about 10% by weight are typically added, while this quantity refers to the curd content in the suspension on the one hand and to the treated milk the sterilised bactofugate is optionally added to on the other. Lower amounts may also be possible, but are not very economical, whereas larger amounts may lead to a bonding of the structures within the Mozzarella.

Further Processing

As described above, the milk in the vat or cheese milk is separated into whey and curd after coagulation. Deviating from the production of semi-hard cheese, the curd mass, however, is not pressed into shapes and matured in brine. In the production of pasta filata cheese products there now follows a thermal treatment where the curd is boiled in water for several minutes at about 55 to 90° C., and then a mechanical treatment where the cheese is stretched-kneaded and, already salted, allowed to dry until it exhibits its characteristic consistency. Only then the mass obtained is placed into moulds, is set into brine and is cooled, in the process of which cooling is performed by water, brine, and air. This is a standard process widely used in the cheese-making industry, which does not need any further explanation.

INDUSTRIAL APPLICABILITY

A further subject matter of the invention relates to the use of a suspension of curd particles in water, in a dairy product, preferably in whey, to improve the thermo-physical properties of pasta filata cheese products, particularly of Mozzarella. The suspensions preferably contain curd particles having a diameter of less than 250 μm, preferably less than 150 μm. Preferably, such suspensions are employed which have a solids content—which is substantially identical with the content in curd particles—within the range of about 1 to about 10% by weight and particularly about 5% by weight. The added amount is also, preferably, about 0.1 to about 10% by weight—based on the curd content within the suspension on the one hand, and on the treated milk the sterilised bactofugate is added to on the other.

EXAMPLES

Example 1

Production of a Stable Curd Particle Suspension in Whey

100 L whey from the coagulation of cheese milk were separated from the curd using a drainage belt, and the curd particles (with a dry matter content of ca. 5% by weight) contained therein having a size of between 0.01 and 3 mm were separated by means of separation and were further ground to a mean particle size of about 200 μm in a colloid mill and a homogeniser.

Example 2

Production of a Stable Curd Particle Suspension in Skimmed Milk

100 L whey from the coagulation of cheese milk were separated from the curd using a drainage belt, and the curd particles (with a dry matter content of ca. 5% by weight) contained therein having a size of between 0.01 and 3 mm were separated by means of separation and were further ground to a mean particle size of about 200 μm in a colloid mill and a homogeniser. Subsequently, the whey mixture and the curd particles were re-dispersed in skimmed milk.

Example 3

Production of a Stable Curd Particle Suspension in Water

100 L whey were separated as described above and concentrated in an evaporator to a dry matter content of about 20% by weight. The adhering whey was washed out and the cheese fines were subsequently re-dispersed in water, so that a dry matter content of 5% by weight was achieved again. Subsequently, the suspension was ground in a colloid mill to a mean particle size of about 150 μm.

Example 4

Production of Mozzarella (According to the Invention)

A bacterial concentrate was separated from 100 L standardised skimmed milk (fat-to-protein ratio of 1.1) in a bactofuge. 10 L of the suspensions of examples 2 and 3 (1.1) were added to the concentrate, were homogenised by means of an Ultraturrax, were heated to 135° C. for a period of 50 seconds and were added to the diluted cheese milk. 4-10 DCU Mozzarella starter culture and 8 g rennet/100 L cheese milk were added to the combined product. After coagulation, the whey containing the fine curd particles was separated from the curd using a drainage belt and was further processed as described above. Subsequently, the curd was boiled for several minutes at 90° C., then mechanically post-processed and eventually shaped and cooled.

Comparison Example V1

Production of Mozzarella (not According to the Invention)

A bacterial concentrate was separated from 100 L standardised skimmed milk (fat-to-protein ratio of 1.1) in a bactofuge. 10 L of the suspensions of examples 2 and 3 (1.1) were added to the concentrate and homogenised by means of an Ultraturrax, were heated to 135° C. for a period of 50 seconds and were added to the diluted cheese milk. 4-10 DCU Mozzarella starter culture and 8 g rennet/100 L cheese milk were added to the combined product. After coagulation, the whey containing the fine curd particles was separated via a drainage belt from the curd. Subsequently, the curd was boiled for several minutes at 90° C., then mechanically post-processed in a known manner and eventually shaped and cooled. Thus, no addition of the homogenised suspension of cheese fines was performed in this comparison example.

The process according to the invention is exemplarily explained in FIG. 1 by means of a flowchart. Herein, (BAK) stands for bactofuge, (MIX) stands for mixer, (FER) stands for fermenter, (SEP) stands for separator, (HOM) stands for homogeniser, and (TEM) stands for cooker/stretcher.

Example 5

Sampling

Samples of two Mozzarella grades, i.e., according to example 1 of the invention and according to the comparison example V1 were evaluated for their thermo-physical and sensory properties by a panel consisting of 5 trained food technicians, i.e.
(A) Taste quality (intensity)
(B) Flavour quality (no interfering aromas)
(C) Stability against loss of water
(D) Hardness
(E) Stretching behaviour (in pizza application)
(F) Browning behaviour (in pizza application)

Evaluation was performed on a scale from 1 (=low) to 5 (=very pronounced). The results (averages) are reflected in Table 1.

TABLE 1

| Results of the sampling | | |
|---|---|---|
| Property | 4 | V1 |
| Taste quality | 4.5 | 3.5 |
| Flavour quality | 4.0 | 3.5 |
| Stability against loss of water | 4.0 | 3.5 |
| Hardness | 4.0 | 3.0 |
| Grinding behaviour | 4.0 | 3.0 |
| Stretching behaviour | 4.0 | 2.5 |
| Browning behaviour | 4.5 | 2.5 |

Figure 2:
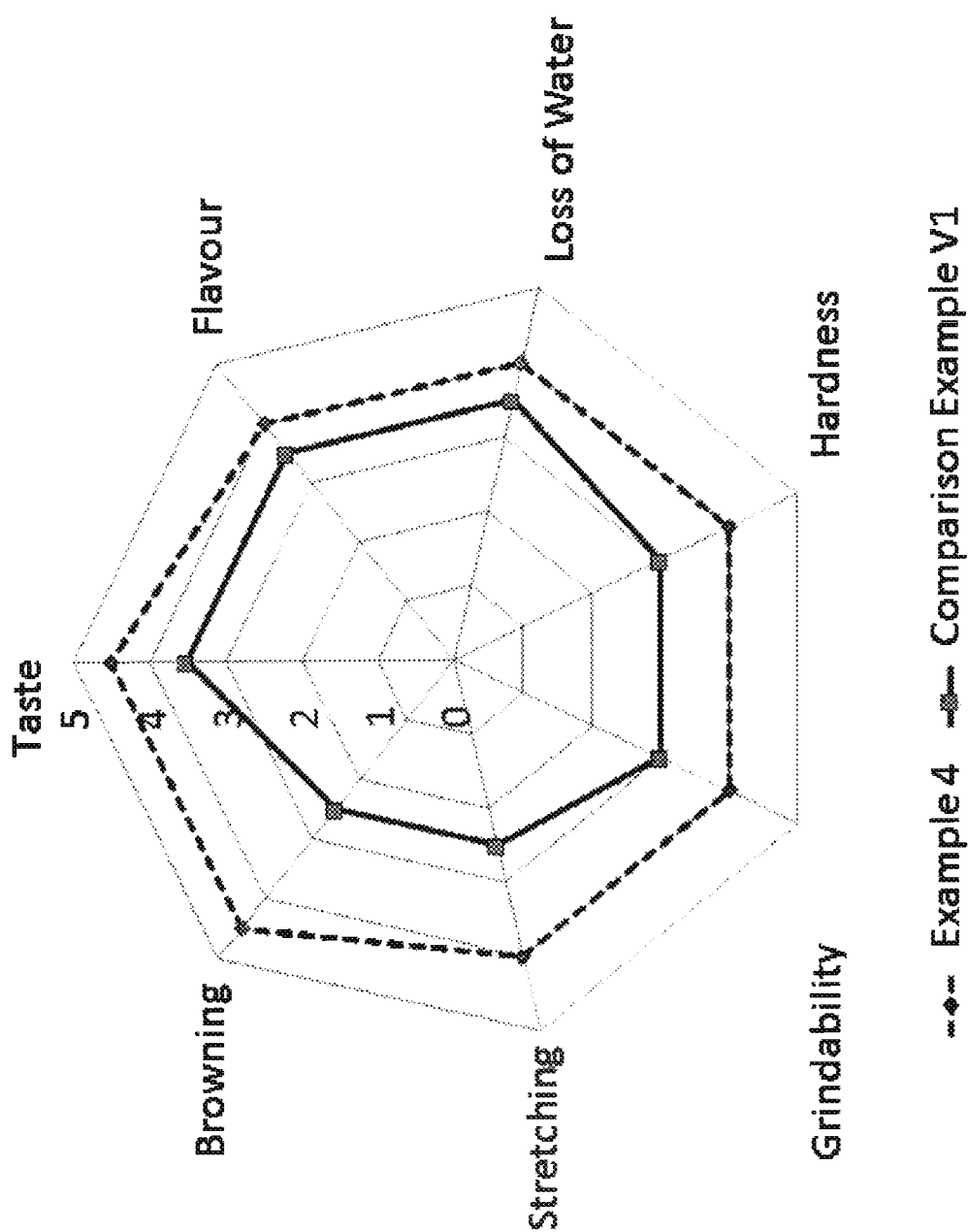
FIG. 2 illustrates results of a comparison of the product prepared according to the present invention with a comparison example.

In comparison with the comparison product, the Mozzarella grade of the invention is characterised in that it exhibits a significantly better taste and has practically no interfering aromas. The product takes up less water and, therefore, oils out to a lesser extent. It proves to be harder, which is also advantageous with regard to its grinding behaviour. In the pizza application, it forms visibly longer threads and browns better without tending to char. The results are also visualised in FIG. 2.

The invention claimed is:

1. A process for the production of pasta filata cheese products of the Mozzarella type, comprising the following steps:
   (1) processing a whey obtained from coagulation of cheese milk into a stable suspension, wherein
      whey is wholly or substantially separated,
      resulting dry, or substantially dry, curd particles are re-suspended in water or in another dairy product,
      a suspension such obtained is subjected to homogenization, and
      said suspension contains particles having a diameter of less than 250 μm;
   (2) providing a milk;
   (3) subjecting the milk to bactofugation, obtaining a bacterial concentrate and a treated milk;
   (4) adding the suspension produced in step (1) to the bactofugate obtained in step (3) and sterilizing the thus-obtained mixture;
   (5) re-adding the mixture of step (4) to the treated milk obtained in step (3);
   (6) coagulating the milk of step (5) while adding starter cultures and/or rennet material;
   (7) separating the milk coagulated in of step (6) into whey and curd;
   (8) heat treating the curd obtained in step (7); and
   (9) shaping and cooling the product heat-treated in step (8),
   wherein the whey obtained in step (7) is further processed to the stable suspension of step (1).

2. The process of claim 1, wherein raw milk, semi-skimmed milk or skimmed milk is employed.

3. The process of claim 1, wherein the milk is standardised by adding cream, skimmed milk, whey cream, buttermilk or milk protein concentrate.

4. The process of claim 3, wherein the milk is adjusted to a fat-to-protein ratio of about 0.2 to about 1.2.

5. The process of claim 3, wherein the standardised milk is subjected to bactofugation.

6. The process of claim 1, wherein homogenisation is performed mechanically and/or thermally and/or (bio) chemically.

7. The process of claim 6, wherein homogenisation is performed by cavitation.

8. The process of claim 1, wherein said suspension contains particles having a diameter of less than 150 μm.

9. The process of claim 1, wherein said suspension has a portion in solid curd particles within the range of about 0.1 to about 10% by weight.

* * * * *